United States Patent [19]

de Jong

[11] Patent Number: 5,008,660
[45] Date of Patent: Apr. 16, 1991

[54] ELECTROMAGNETIC DETECTION SYSTEM

[75] Inventor: Hendrik J. de Jong, Groenlo, Netherlands

[73] Assignee: N.V. Nederlandsche Apparatenfabriek Nedap, De Groenlo, Netherlands

[21] Appl. No.: 318,303

[22] Filed: Mar. 3, 1989

[30] Foreign Application Priority Data

Mar. 4, 1988 [NL] Netherlands ............... 8800546

[51] Int. Cl.$^5$ .................. H04B 5/00; A01K 5/00
[52] U.S. Cl. ..................... 340/825.54; 119/51.02
[58] Field of Search ............ 340/825.54, 505, 572; 343/866, 741; 119/51.02, 158

[56] References Cited

U.S. PATENT DOCUMENTS

| | | | |
|---|---|---|---|
| 3,541,995 | 11/1970 | Fathauer | 340/825.54 |
| 3,790,945 | 2/1974 | Fearon | 340/572 |
| 4,068,211 | 1/1978 | Van Tol | 340/505 |
| 4,095,214 | 6/1978 | Minasy | 340/552 |
| 4,274,083 | 6/1981 | Tomoeda | 340/825.72 |
| 4,384,281 | 5/1983 | Cooper | 340/505 |
| 4,617,876 | 10/1986 | Hayes | 119/51.02 |
| 4,655,170 | 4/1987 | DaSilva | 119/51.02 |
| 4,798,175 | 2/1989 | Townsend et al. | 119/51.02 |

FOREIGN PATENT DOCUMENTS

| | | |
|---|---|---|
| 0186483 | 7/1986 | European Pat. Off. . |
| 0761557 | 8/1953 | United Kingdom ............... 343/866 |
| 2164185 | 3/1986 | United Kingdom . |

OTHER PUBLICATIONS

Wescon Technical Papers, No. 18, 1974, pp. 1-7; J. P. Hanton: "Electronic Means of Livestock Identification" *p. 3, right-hand column, laser section; FIG. 1.

Primary Examiner—Donald J. Yusko
Assistant Examiner—Dervis Magistre
Attorney, Agent, or Firm—Fleit, Jacobson, Cohn, Price, Holman & Stern

[57] ABSTRACT

An electromagnetic detection system comprises a transmitter-receiver apparatus coupled to at least one antenna element to form an electromagnetic interrogation field in an interrogation zone defined at least in part by physical means. A plurality of responders is capable of generating a detectable signal under the influence of an interrogation field. According to the invention, at least one antenna element is a suitably formed structural element forming part of the physical means.

4 Claims, 1 Drawing Sheet

ELECTROMAGNETIC DETECTION SYSTEM

This invention relates to an electromagnetic detection system comprising a transmitter-receiver apparatus coupled to at least one antenna element to form an electromagnetic interrogation field in an interrogation zone defined at least in part by physical means, and a plurality of responders capable of generating a detectable signal under the influence of an interrogation field.

Detection systems of this kind are well known in various embodiments for various uses. Thus, for example, Netherlands patent application No. 7708012 discloses an electromagnetic detection system arranged as an anti-shop-lifting system. The responders include a resonance circuit which in an interrogation field with the correct frequency is brought into the resonating state. The responder then transmits itself a signal which can be detected. The responder is also a specific electrical load on the means generating the interrogation field, which can also be detected. A system in which the signal transmitted by a responder is detected is called a transmission system. A system in which the load formed by a responder is detected is called an absorption system. The present invention is applicable to both types of systems. The term transmitter-receiver or transmitter-receiver apparatus, as used herein, means any suitable configuration of transmission means and receiving means with which an interrogation field can be formed and a responder can be detected, irrespective of the nature of the detection system.

Other known systems are electromagnetic detection systems arranged for detecting and recognizing certain persons, articles, vehicles, animals and the like, or the class or group to which the persons, articles, vehicles, animals and the like belong. Such a system comprises responders which in a suitable interrogation field generate a coded signal. A responder of this kind is described, for example, in Netherlands patent 176404.

The responder as described in Netherlands patent 176404 finds application on a large scale in, for example, cattle recognition systems. A cow or a pig carries a responder, for example, on a collar. When this responder comes in the vicinity of a transmitter coil with which an electromagnetic interrogation field of radio frequency is transmitted, the responder reacts by transmitting a unique code. This code is received by an antenna, which may be the same antenna as the transmitting antenna, is detected in an electronic apparatus, and supplied to a computer. The computer then determines, in accordance with a program previously entered into it, how much food the animal is still entitled to, whereafter this quantity can be automatically deposited in a manger in the vicinity of the animal. Fencing or railing is provided to ensure that only that particular animal receives its portion and that the animal is not disturbed by other animals while eating.

In practice, in many cases animals are, as it were, caused to pass through the antenna for the detection of the responder they are wearing. In that case, the antenna coil has appropriate dimensions, for example, 2×1 m. To produce the correct tuned frequency and the correct field strength, such a coil consists of a plurality of windings, e.g. 15. In addition, the coil must be robust (resistant to biting and the environment of the stable) and will have to be housed in a tube for protection. The tube must in turn be treated and sealed against the ingress of moisture. In practice, these requirements often lead to complicated and objectionable constructions of the antenna coil, which in addition require a great deal of time for installation.

Similar drawbacks may be encountered in electromagnetic detection systems designed for other uses. Thus Netherlands patent application 7708012 and also, for example, U.S. Pat. No. 4095214 describe electromagnetic detection systems designed as anti-shop-lifting systems employing antenna coils provided in the floor of the shop. For this purpose, either slots are cut in the floor, in which the antenna coils can be laid, or special raised floor sections are used, in which the antenna coils can be placed. The raised floor sections have no further function whatsoever and are generally regarded as objectionable, because they adversely affect ready access to the shop, in particular for wheel chair users, people with perambulators, and the like.

It is an object of the present invention to overcome the disadvantages outlined above. For this purpose, according to the invention, an electromagnetic detection system of the kind described above is characterized in that said at least one antenna element is a suitably formed structural element forming part of said physical means.

One embodiment of the invention will now be described, by way of example, with reference to the accompanying drawings. In said drawings, FIG. 1 diagrammatically shows the electrical configuration of a detection system according to this invention;

FIG. 2 diagrammatically shows, in side-elevational view, one example of a cattle feeding station embodying the present invention;

FIG. 3 diagrammatically shows a front-elevational view of the cattle feeding station of FIG. 2; and FIG. 4 is a cross sectional view illustrating an antenna provided with insulating cladding according to the present invention.

DETAILED DESCRIPTION OF THE DRAWINGS

A transmitter-receiver 1 is coupled with an antenna coil 2 comprising one turn only. Normally, a coil is used which has more turns. In the example shown, therefore, an impedance transformer 3 is used which effects impedance matching between the transmitter-receiver and the single-turn antenna coil.

Figure 1:
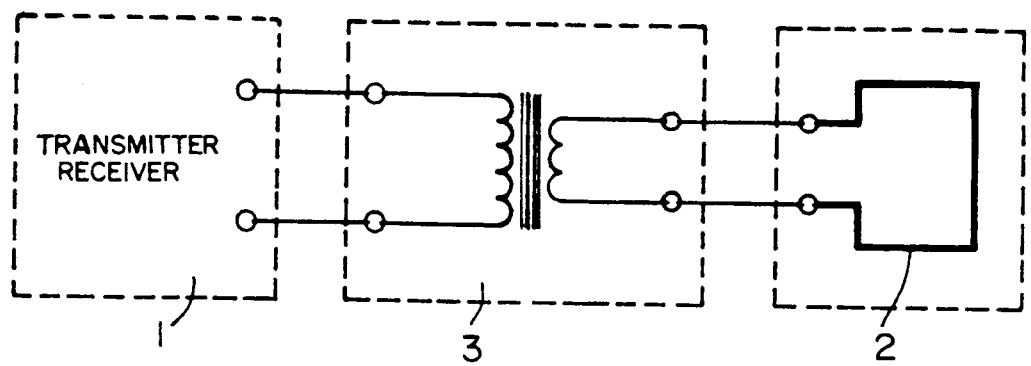
Figure 2:
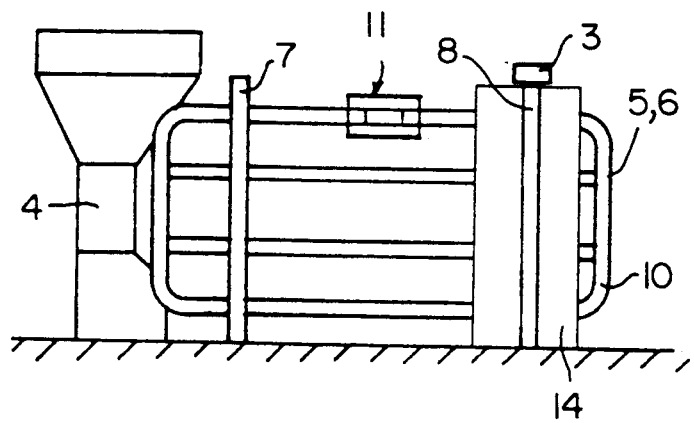

In view of the relatively high currents which, in operation, may flow in coil 2 and the low permitted impedance of coil 2, the transformer 3 is preferably positioned as closely to coil 2 as possible (also see FIG. 2).

Figure 3:
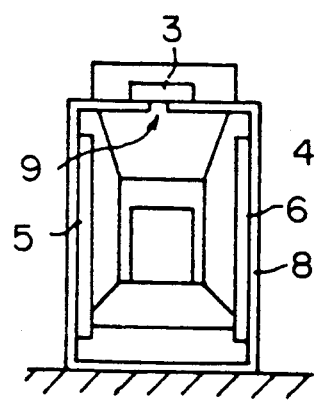

FIG. 2 and FIG. 3 diagrammatically show a side-elevational view and a front-elevational view, respectively, of one example for reducing the invention to practice. The system illustrated is an automatic feeding station for animals, for example, cows or swine. The station comprises a manger 4 equipped with a computer-controlled doser for dispensing metered portions of food. To prevent an animal from being displaced by other animals while eating at manger 4, two side railings 5 and 6 are provided. Side railings 5 and 6 are kept in position by bows 7 and 8. The advantage of the single-turn antenna coil is now evident. At least one of the bows, which should be provided for structural reasons, is at the same time a single-turn antenna coil. In the example shown, bow 8 is arranged as an antenna coil. Bow 8 is interrupted at 9. At this interruption, impedance transformer 3 is mounted. When an animal wearing a responder now enters the feeding station, the electromagnetic field of coil 8 will actuate the responder. The code of the responder is received by coil 8 and passed through the transmitter-receiver apparatus 1 to a computer which, in a pre-programmed manner, determines whether the animal is still entitled to any food portions. If the computer finds there is still an amount due, these portions are subsequently metered and dispensed to manger 4, and the animal may eat.

In the present example, the single-turn antenna coil is used as a so-called passage antenna, that is to say, the animal wearing a responder moves bodily through the antenna. It is clear that, in addition to animals, objects such as pallets with goods, or even people, can be detected provided they are equipped with a coded or non-coded responder. It is not necessary for the objects to be detected to pass through the antenna. A responder is also detected just in front of the plane of the antenna, if the responder is within the detection range of the antenna. This property is of importance in situations in which the antenna is mounted on, or within, walls or doors.

The essential feature of the present invention is that the single-turn antenna coil is simple and robust and can be used in a simple manner as a structural element of fencing, railing, gates, door and window frames, or other constructions which are necessary anyway for other reasons.

In the example shown, an alternative would be for bow 7 to be formed as an antenna coil, either as the only antenna or as a second antenna in combination with bow 8.

A further alternative would be for a side railing to form an antenna coil. For this purpose the loop-shaped bow or tube 10 forming the outer frame of a side railing could be used. In a similar manner to that shown for bow 8, tube 10 should then be interrupted and connected to an impedance transformer, as indicated diagrammatically at 11 by way of example.

Figure 4:
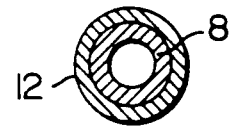

It should be noted that the structural elements functioning as an antenna coil should be mounted so that they are insulated from other conductive structural elements. This can be effected in a conventional manner by using plastics insulators or plastics fastening elements. The structural elements functioning as an antenna coil can further, if desired, be provided with tubular insulating cladding material 12 surrounding the box 8 in a tubular form as shown in FIG. 4. In most cases this is not strictly necessary, as the electrical potential of the element forming the antenna coil in operation is very low, so that it can be touched without any danger or disagreeable effects.

It should further be noted that various modifications of the embodiment shown and many alternative applications will readily occur to those skilled in the art after reading the foregoing. Thus, for example, it is also possible to form an interrogation field by means of sheet-like antennas as shown at numeral 14 in FIG. 2 whereby the bow antenna 8 is replaced by a sheet-like antenna 14 serving the same purpose. Such sheet-like antennas, like antenna coils, can take the form of structural elements.

These and similar modifications are considered to fall within the scope of the present invention.

I claim:

1. An electromagnetic detection system comprising a transmitter-receiver apparatus and at least one antenna element, said transmitter-receiver apparatus being coupled to said at least one antenna element to form an electromagnetic interrogation field in an interrogation zone, structural confining means for defining the range and area of said interrogation zone and for physically confining mobile entities to be interrogated in said interrogation zone, and a plurality of responders attached to each of said mobile entities and capable of generating a detectable signal under the influence of said interrogation field, said at least one antenna element being formed as an integral part of said structural confining means, said structural confining means comprising an automatic feeding station for animals comprising a food dispenser, two side railings, and two bows for reinforcing said side railings and extending over said railings and said interrogation zone, said at least one antenna element being integrally formed with at least one of said bows.

2. The detection system of claim 1, and further comprising an interruption in said at least one bow incorporating said at least one antenna element, said interruption being positioned over said interrogation zone.

3. The detection system of claim 2, and further comprising an impedance transformer mounted at said interruption over said interruption zone.

4. The detection system of claim 1, and further comprising a manger attached to said structural confining means for feeding cattle in said interrogation zone.

* * * * *